US008225889B2

(12) United States Patent
Wetter et al.

(10) Patent No.: US 8,225,889 B2
(45) Date of Patent: Jul. 24, 2012

(54) DRILL HEAD FOR ROCK DRILLS

(75) Inventors: Christoph Wetter, Feldkirch (AT); Roland Foser, Schaan (LI); Jens Schneider, Feldkirch (AT); Markus Meierhofer, Grabs (CH)

(73) Assignee: Hilti Aktiengesellschaft, Schaan (LI)

( * ) Notice: Subject to any disclaimer, the term of this patent is extended or adjusted under 35 U.S.C. 154(b) by 156 days.

(21) Appl. No.: 12/640,612

(22) Filed: Dec. 17, 2009

(65) Prior Publication Data

US 2010/0158625 A1 Jun. 24, 2010

(30) Foreign Application Priority Data

Dec. 18, 2008 (DE) ........................ 10 2008 054 869

(51) Int. Cl.
*E21B 10/40* (2006.01)

(52) U.S. Cl. ....................................... 175/415; 175/420

(58) Field of Classification Search .................. 175/293, 175/296, 414, 415, 417, 419, 420
See application file for complete search history.

(56) References Cited

U.S. PATENT DOCUMENTS 1,000,067 A 8/1911 Bennett
6,283,232 B1 * 9/2001 Batliner et al. .............. 175/415
6,588,519 B2 * 7/2003 Knoller ..................... 175/420.1
7,055,633 B2 * 6/2006 Cramer et al. ................ 175/415
7,497,282 B2 * 3/2009 Batliner et al. ............... 175/415
2004/0079556 A1 * 4/2004 Cramer et al. ................ 175/415
2007/0278016 A1 * 12/2007 Koch ......................... 175/420.1

FOREIGN PATENT DOCUMENTS

DE 29 12 394 A1 10/1980
DE 197 09 771 A1 9/1998
DE 197 24 373 A1 12/1998
DE 100 09 732 A1 9/2001
EP 0 251 220 A1 1/1988
EP 1 923 159 A1 5/2008

OTHER PUBLICATIONS

European Search Report, dated Sep. 19, 2011, 7 pages.

* cited by examiner

*Primary Examiner* — William P Neuder
(74) *Attorney, Agent, or Firm* — Crowell & Moring LLP

(57) ABSTRACT

A drill head extending along a drill axis made of hard metal for rock drills is disclosed. The drill head features at least one major cutting edge and at least one minor cutting edge, where the major cutting edge extends from a first radially inner end to a first radial outer end which lies on a first diameter and where the minor cutting edge extends from a second radially inner end to a second radially outer end which lies on a second diameter that is smaller than the first diameter. A first enveloping surface defined by the minor cutting edge projects completely axially over a second enveloping surface defined by the major cutting edge.

5 Claims, 1 Drawing Sheet

10
12
11
12
11
15
14

DRILL HEAD FOR ROCK DRILLS

This application claims the priority of German Patent Document No. 10 2008 054 869.3-24, filed Dec. 18, 2008, the disclosure of which is expressly incorporated by reference herein.

BACKGROUND AND SUMMARY OF THE INVENTION

The present invention relates to a drill head.

Drill heads for rock drills have cutting edges made of a cutting material, preferably a hard metal, and are embodied, for example, as solid carbide drill heads or drill heads made of several parts. Hard metal should be understood in the present case to mean sintered or molten carbides, silicides, borides or their alloys.

The rock drills equipped with a drill head are normally used in connection with axial-impact-supported rotary drills, particularly hand-operated drills, and are used as a rule for the rotary percussive creation of bore holes or through holes in concrete or masonry. The axial impacts are delivered on the shank end of the rock drill inserted into the tool receptacle and initiated via the shank as well as the drill head in the substrate that is being processed. In this way the substrate is processed in a scraping and chiseling manner and reduced chip-by-chip. In addition to the high requirements with respect to the achievable drilling progress and the required expenditure of energy, rock drills should also have the highest possible service life.

A rock drill is known from German Patent Document No. DE 197 24 373 A1, which has a drill shank with at least one removal groove running helically along its longitudinal extension for removed drill cuttings. Furthermore, the rock drill has a drill head made totally of hard metal, which is connected with the front end of the drill shank. The drill head has a major cutting edge as well as at least one minor cutting edge, each of which are arranged along diagonals of the drill head. The major cutting edge extends in the radial direction up to a first diameter, whereas the minor cutting edge extends in the radial direction up to a second diameter, which is smaller than the first diameter. The minor cutting edge in this case, projects axially over the peripheral region of the major cutting edge.

When drilling on rebar, essentially only the major cutting edge removes the rebar and consequently represents the lion's share of the removal rate which produces a high level of stress on the cutting edge.

The object of the present invention is therefore to create a drill head for rock drills, in which the chip removal is optimized and which enables a higher drilling speed on rebar.

According to this, the minor cutting edge and the diameter-determining major cutting edge are arranged on the drill head such that an enveloping surface of the minor cutting edge projects completely axially over an enveloping surface of the major cutting edge (diameter-determining in this case means that the major cutting edge determines the diameter of a drill hole produced with the drill). Because of this measure, when the drill is in operation, the cutting of any rebar that is tapped by drilling is distributed over all cutting edges. In this case, the minor cutting edge removes a portion of the rebar, and the major cutting edge the remainder.

In addition, experiments have shown that a drill with a drill head according to the invention no longer drifts or runs laterally in the event of an impact with rebar so that pins can also easily be used in drill holes with rebar impacts. Furthermore, the drill head has a reduced tendency to get stuck on rebar.

In an advantageous embodiment of the invention, the drill head has precisely two major cutting edges and two minor cutting edges, whereby the cutting behavior is further improved.

A cutting behavior that is further optimized is produced if the at least one major cutting edge runs at a right angle to the at least one minor cutting edge.

The at least one major cutting edge as well as the at least one minor cutting edge each run advantageously linearly.

The invention is depicted in the drawings in one exemplary embodiment.

DETAILED DESCRIPTION OF THE DRAWINGS

Figure 1:
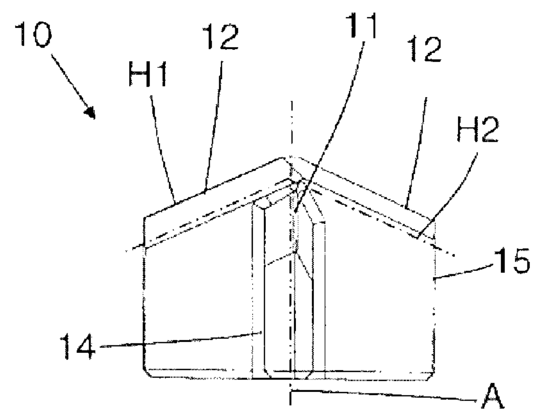
FIG. 1 is a side view of a drill head according to the invention.
Figure 3:
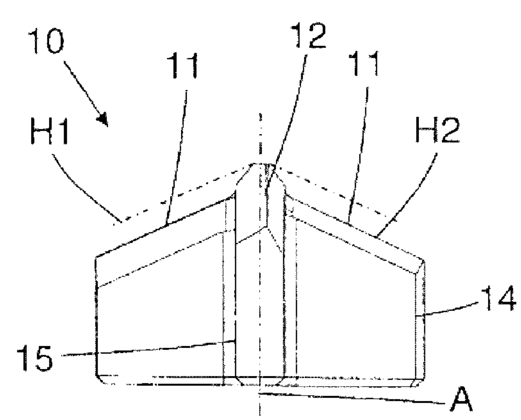
FIG. 3 is a second side view of the drill head from FIG. 1.

FIGS. 1 through 4 depict a drill head 10 for rock drills according to the invention, which extends along a drill axis A and which is designed as a hard metal head and features two major cutting edges 11 as well as two minor cutting edges 12. The major cutting edges 11 and the minor cutting edges 12 in this case are arranged on two cutting plates 14, 15 that cross at a right angle. Alternatively, the drill head could also be embodied as a so-called solid carbide head, which is, for example, butt soldered onto a drill shank (not shown in the figures). The depicted hard metal head, on the other hand, is inserted into corresponding grooves arranged in a cruciform manner on the end of drill shank (not shown in the figures) and soldered therein. The major cutting edges 11 extend from a first radially inner end 16 to a first radially outer end 17. The first radial outer end 17 thereby lies on a first diameter D1. The minor cutting edge 12, on the other hand, extends from a second radially inner end 18 to a second radially outer end 19. This second radial outer end 19 thereby lies on a second diameter D2, which is smaller than the first diameter D1. As a result, the major cutting edge 11 determines the diameter of a drill channel created by the drill head 10.

The minor cutting edges 12 define a first enveloping surface H1, which projects completely axially over a second enveloping surface H2 defined by the major cutting edges. The enveloping surfaces H1, H2 in this case are the surfaces which, during a rotation of the minor cutting edges 12 or, respectively, of the major cutting edges 11, around the axis A, are spanned by these. In this case, the traces of the enveloping surfaces H1, H2 are indicated respectively as dot-dashed lines in FIGS. 1 and 3.

Figure 2:
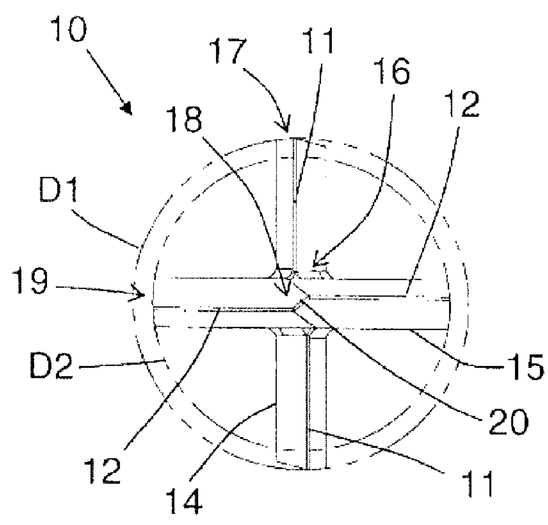
FIG. 2 is a top view of the drill head from FIG. 1.
Figure 4:
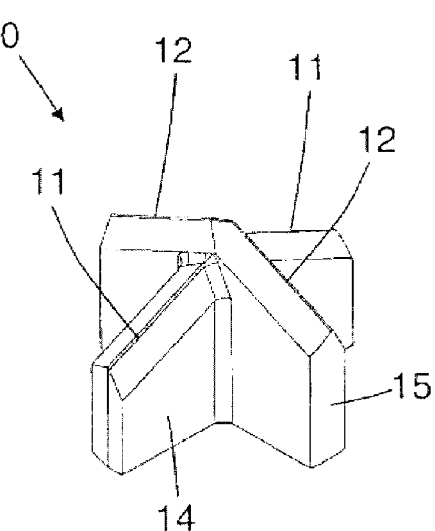
FIG. 4 is a perspective view of the drill head from FIG. 1.

As FIG. 2 in particular shows, the major cutting edges 11 are each at a right angle to the minor cutting edges 12. The major cutting edges 11 and the minor cutting edges 12 run linearly in the depicted exemplary embodiment. However, as an alternative, they could also each be curved once or several times. The two major cutting edges 11 are connected to each other in the region of the tip of the drill head 10 via a chisel edge 20. In an alternative embodiment, this type of chisel edge could also be dispensed with.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drill head made of hard metal for rock drills, which extends along a drill axis, comprising:

at least one major cutting edge; and at least one minor cutting edge;

wherein the at least one major cutting edge extends from a first radially inner end to a first radially outer end which lies on a first diameter and wherein the at least one minor cutting edge extends from a second radially inner end to a second radially outer end which lies on a second diameter that is smaller than the first diameter;

and wherein an enveloping surface of the at least one minor cutting edge projects completely axially over an enveloping surface of the at least one major cutting edge during an entire rotation of the at least one minor cutting edge and the at least one major cutting edge.

2. The drill head according to claim 1, wherein the drill head includes two major cutting edges and two minor cutting edges.

3. The drill head according to claim 1, wherein the at least one major cutting edge runs at a right angle to the at least one minor cutting edge.

4. The drill head according to claim 1, wherein the at least one major cutting edge and the at least one minor cutting edge each run linearly.

5. The drill head according to claim 2, wherein the two major cutting edges are connected to each other in a region of a tip of the drill head via a chisel edge.

* * * * *